United States Patent
Wong et al.

(10) Patent No.: US 7,996,847 B2
(45) Date of Patent: Aug. 9, 2011

(54) METHOD FOR CORRELATING PROCESSOR USAGE TO CUSTOMER BILLING IN AN ON-DEMAND SERVER WITH REAL-TIME ALLOCATION/DEALLOCATION OF PROCESSING RESOURCES

(75) Inventors: Kit H. Wong, Round Rock, TX (US); Fernando A. Lopez, Cary, NC (US); Jacques M. Ragan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1273 days.

(21) Appl. No.: 11/609,936

(22) Filed: Dec. 13, 2006

(65) Prior Publication Data

US 2008/0148269 A1    Jun. 19, 2008

(51) Int. Cl.
G06F 9/46 (2006.01)
G06F 17/60 (2006.01)

(52) U.S. Cl. ........ 718/104; 718/100; 705/30; 705/14.46

(58) Field of Classification Search .................. 718/100, 718/102, 104; 702/132; 705/14.46, 30, 400
See application file for complete search history.

(56) References Cited

U.S. PATENT DOCUMENTS

| | | | |
|---|---|---|---|
| 5,649,187 A | 7/1997 | Hornbuckle | |
| 6,721,892 B1* | 4/2004 | Osborn et al. | 713/300 |
| 7,266,712 B2* | 9/2007 | George et al. | 713/322 |
| 7,284,054 B2* | 10/2007 | Radhakrishnan | 709/226 |
| 7,349,762 B2* | 3/2008 | Omizo et al. | 700/278 |
| 2002/0120565 A1 | 8/2002 | Yu et al. | |
| 2002/0173977 A1 | 11/2002 | Dutta | |
| 2003/0046409 A1 | 3/2003 | Graham | |
| 2004/0128263 A1 | 7/2004 | Dosanjh | |
| 2005/0004879 A1* | 1/2005 | Mathias et al. | 705/400 |

* cited by examiner

*Primary Examiner* — Meng A An
*Assistant Examiner* — Caroline Arcos
(74) *Attorney, Agent, or Firm* — Cynthia Seal; Hoffman Warnick LLC

(57) ABSTRACT

The invention is directed to a method for correlating processor usage to customer billing in an on-demand server with real-time allocation/deallocation of processing resources. A method in accordance with an embodiment of the present invention includes: providing a plurality of processors, each processor having thermal control circuit (TCC) logic; determining a processing requirement for the plurality of processors; and dynamically controlling a processing capability of the plurality of processors to provide the determined processing requirement by selectively enabling or disabling the TCC logic of each processor.

8 Claims, 1 Drawing Sheet

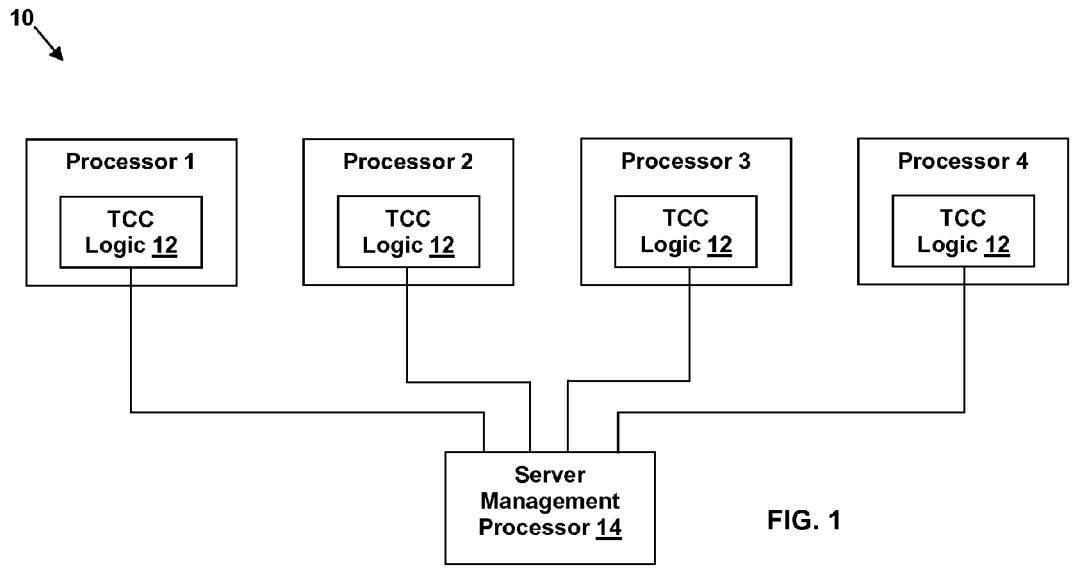
FIG. 1
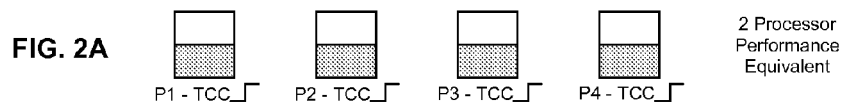
FIG. 2A — 2 Processor Performance Equivalent
FIG. 2B — 2 ½ Processor Performance Equivalent
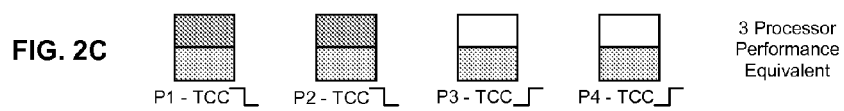
FIG. 2C — 3 Processor Performance Equivalent
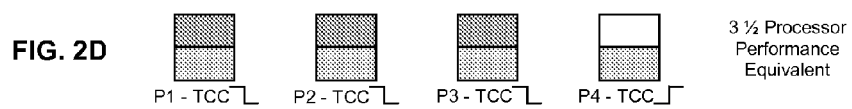
FIG. 2D — 3 ½ Processor Performance Equivalent
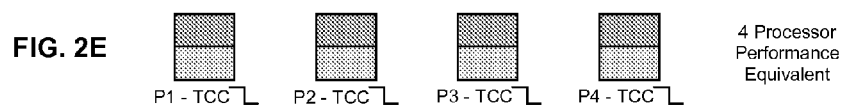
FIG. 2E — 4 Processor Performance Equivalent
TCC ⎍ Enabled = "1"
TCC ⎌ Disabled = "0"

METHOD FOR CORRELATING PROCESSOR USAGE TO CUSTOMER BILLING IN AN ON-DEMAND SERVER WITH REAL-TIME ALLOCATION/DEALLOCATION OF PROCESSING RESOURCES

BACKGROUND OF THE INVENTION

1. Field of the Invention

The present invention generally relates to processing systems. More specifically, the present invention is directed to a method for correlating processor usage to customer billing in an on-demand server with real-time allocation/deallocation of processing resources.

2. Related Art

Currently, there is no effective method for allocating processor cycles in real-time under typical customer operating environments. The only known solution is to equip servers with additional processors that are disabled until increased demand requires them to be activated. However, when additional processing resources are required, a server must be rebooted in order to activate the additional processors. The additional processors (e.g., cores) are enabled during POST (power-on self test) and then recognized by the operating system, at which point the additional processors can start performing useful work. Companies that use their servers for transaction, billing, or database processing would lose large sums of money during the downtime required to enable the additional processors.

In the current on-demand business model, a customer can have inactive processing resources on their systems that they must decide when to activate. Once the customer decides to activate the processing resources, they are charged for the entire cost of the newly activated processing resources, even if they only need a percentage of the available processor cycles for a small amount of time. Furthermore, if the workload decreases, the customer does not have the flexibility to disable and stop paying for the unused processing resources, since they have already completely purchased them when they activated them for the first time.

An important factor in the current on-demand business model is software licenses, which typically offer a customer limited choices for licensing payments. Common licensing models include: 1) the customer buys a perpetual license for a system with X number of processors and Y number of users; and 2) the customer buys a (1, 2, 3, 4, or 5) year license for a system with X number of processors and Y number of users. The customer is required to forecast any future increases in system demands that might occur and allocate financial resources to purchase additional licenses when needed. This means that the customer will have to pay extra, regardless of the licensing model used, for a new license that will cover the new system configuration plus the new projected number of users, even if the additional processing capability is required only for a short period of time. If the additional processing resources are no longer needed, for example due to a decrease in server workload, the customer is still obligated to pay based on the type of licensing agreement (e.g., per year or perpetual).

Accordingly, there is a need for an on-demand infrastructure in which processing cycles are dynamically allocated in real-time without requiring server system reboot for the operating system to recognize the additional processing resources, and in which processing capability can be increased and decreased in real-time depending on fluctuating server workloads.

SUMMARY OF THE INVENTION

The present invention is directed to a method for correlating processor usage to customer billing in an on-demand server with real-time allocation/deallocation of processing resources.

A first aspect of the present invention is directed to a method for selectively allocating and deallocating processing resources, comprising: providing a plurality of processors, each processor having thermal control circuit (TCC) logic; determining a processing requirement for the plurality of processors; and dynamically controlling a processing capability of the plurality of processors to provide the determined processing requirement by selectively enabling or disabling the TCC logic of each processor.

A second aspect of the present invention is directed to a system for selectively allocating and deallocating processing resources, comprising: a server system comprising a plurality of processors, each processor having thermal control circuit (TCC) logic; a system for determining a processing requirement for the plurality of processors; and a system for dynamically controlling a processing capability of the plurality of processors to provide the determined processing requirement by selectively enabling or disabling the TCC logic of each processor.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 1 depicts an illustrative server system in accordance with an embodiment of the present invention.

FIGS. 2A-2E depict an illustrative application of an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention is directed to a method for correlating processor usage to customer billing in an on-demand server with real-time allocation/deallocation of processing resources.

In accordance with an embodiment of the present invention, there is provided a method for charging customers based on real-time processing cycle allocation on a multiprocessor server system. Processor usage is correlated to customer billing with real-time allocation/deallocation of processing resources.

The processing capability of each of the processors in the server system is regulated by an external agent (Server Management Processor (SMP)) that is configured to increase or decrease each processor's instruction execution rate as needed. This allows the execution capability of each processor to be selectively controlled in order to gain access to additional processing power, without having to reboot the server system. In accordance with an embodiment of the present invention, this is done using the TCC logic (Thermal Control Circuit Logic) (or similar control logic) provided on each processor.

Some current processor manufacturers (e.g., Intel) provide an external switch to enable a processor's TCC (or similar) logic. The TCC logic is intended for use as a thermal management solution to cool down the processor core when it reaches higher than recommended operating temperatures. The present invention takes advantage of the TCC logic, not for thermal regulation, but instead to control a processor's operating performance.

Using the present invention, a customer can spread the total cost of additional processor(s) based on the amount of time the processor(s) are used. To this extent, the customer is only charged when the additional processor(s) are enabled. If the workload of the server system increases, one or more additional processors can be dynamically enabled without server downtime. Further, if the workload of the server system decreases, one or more processors can be dynamically deallocated.

As workload demand increases, the SMP can, in real-time, disable the TCC logic on a processor-by-processor basis until the increase in workload is handled. Since the SMP has access to the performance counters of each of the processors, it can intelligently determine when additional processing resources are required. By the same token, the SMP can, again in real-time, also determine when the additional processing resources are no longer needed, and can enable the TCC logic and stop charging the customer for the use of the additional processing resources. Since the SMP controls the activation and deactivation of the TCC logic to every single processor, it can determine how much additional processing resources were used, and for how long, during a period of time. This data can then be processed by the SMP to determine the cost incurred by the customer and an electronic message can be sent to the supplier of the server system for appropriate billing action.

The above process is illustrated in greater detail in the following example, with reference to FIG. 1. Although this example describes a server system including four processors, it will be apparent that the present invention can be applied to a server system having any number of processors.

If a customer requires a server system 10 with the computing capability of two XYZ GHz processors (e.g., provided by Intel) for the present time, but wants to be able to dynamically increase processing power to as much as twice the initial processing capability due to future demands or temporary workload spikes, a supplier of the server system 10 can provide (e.g., sell, lease, etc.) the customer with a server system 10 having four XYZ GHz processors P1, P2, P3, P4, and have the TCC logic 12 active (enabled) on all four processors. An SMP 14 is provided to selectively enable/disable the TCC logic 12 on each processor P1, P2, P3, P4. All of the processors P1, P2, P3, P4 are enabled upon initial system boot, thus making the processors visible to the operating system.

By enabling the TCC logic 12 on each of the four processors P1, P2, P3, P4, each processor effectively executes operations at half the clock speed, since the TCC logic 12 limits the operating frequency of the processor via modulation (starting and stopping the internal clock). As such, the server system 10 with four XYZ GHz processors P1, P2, P3, P4, with the TCC logic 12 enabled on all four processors, can perform an equivalent amount of work as a server system with two XYZ GHz processors, without the TCC logic 12 enabled (two XYZ GHz processor executing code at full-speed).

Instead of allowing all of the processors P1, P2, P3, P4 to run at full-speed, the processing capability of each processor is limited by preconditioning the external inputs to the processor's TCC logic 12. The SMP 14 controls the frequency at which each processor's TCC logic 12 is enabled/disabled therefore controlling the overall system processing performance. As such, the server system 10 does not have to be brought down in order to enable additional processors, since the additional processors are enabled at the initial boot. Further, by having the SMP 14 control the internal core clock of each of the processors, the system performance level can be dynamically regulated in real-time to add/remove processing cycles on-demand.

In accordance with an embodiment of the present invention, the additional processing granularity proposed is half a processor max execution rate at a time, as depicted in FIGS. 2A-2E. Other granularities, such as ¼, ¹/₁₀, etc., are also possible and fall within the scope of the present invention.

In FIG. 2A, the states of the TCC logic 12 of the processors P1, P2, P3, P4 are as follows:
P1: TCC Logic Enabled
P2: TCC Logic Enabled
P3: TCC Logic Enabled
P4: TCC Logic Enabled The overall processing performance of the server system 10 is thus equivalent to two processors operating at full speed.

In FIG. 2B, the states of the TCC logic 12 of the processors P1, P2, P3, P4 are as follows:
P1: TCC Logic Disabled
P2: TCC Logic Enabled
P3: TCC Logic Enabled
P4: TCC Logic Enabled The overall processing performance of the server system 10 is thus equivalent to two and a half processors operating at full speed.

In FIG. 2C, the states of the TCC logic 12 of the processors P1, P2, P3, P4 are as follows:
P1: TCC Logic Disabled
P2: TCC Logic Disabled
P3: TCC Logic Enabled
P4: TCC Logic Enabled The overall processing performance of the server system 10 is thus equivalent to three processors operating at full speed.

In FIG. 2D, the states of the TCC logic 12 of the processors P1, P2, P3, P4 are as follows:
P1: TCC Logic Disabled
P2: TCC Logic Disabled
P3: TCC Logic Disabled
P4: TCC Logic Enabled The overall processing performance of the server system 10 is thus equivalent to three and a half processors operating at full speed.

In FIG. 2E, the states of the TCC logic 12 of the processors P1, P2, P3, P4 are as follows:
P1: TCC Logic Disabled
P2: TCC Logic Disabled
P3: TCC Logic Disabled
P4: TCC Logic Disabled The overall processing performance of the server system 10 is thus equivalent to four processors operating at full speed.

In an illustrative business model, a customer can be charged a fee based on the amount of time each additional processor resource is allocated. The cost of additional processing resources is determined by the SMP based on the number of enabled TCC logic signals. For instance, the customer can be charged for the use of additional processing resources based on the following formula:

On-Demand Processing Resource Cost=[COST FACTOR]*[Number of inactive TCC logic signals]*[Time elapsed while TCC logic signal is inactive]

Where COST FACTOR is defined as:

COST FACTOR=[Price of additional processors installed]+[Amount of desired profit from the additional processors]/[Time to reach desired revenue]

The COST FACTOR variables are explained below:

1. Price of additional processors installed—This is the cost, set by the processor vendor, of the additional processors installed in the server system.

2. Amount of desired profit from the additional processors—This is the amount of money that the supplier of the server system would like to make on top of the initial cost of the additional processors.

3. Time to reach desired revenue—This is the amount of time set by the supplier of the server system to recover its initial investment plus additional revenue. This parameter can be set in hours, days, years, etc.

The above-described formula is used by the SMP to dynamically calculate the on-demand processing resource cost and generate bills for the customer. The SMP can track the billing amounts and, if desired, automatically disable the TCC logic on all of the processors to allow full speed operation after the supplier of the server system has recovered its investment plus desired profit (e.g., lease with an automatic buy).

The foregoing description of the embodiments of this invention has been presented for purposes of illustration and description. It is not intended to be exhaustive or to limit the invention to the precise form disclosed, and many modifications and variations are possible.

What is claimed is:

1. A method for selectively allocating and deallocating processing resources, comprising:
   providing a plurality of processors, each processor having thermal control circuit (TCC) logic;
   determining a processing requirement for the plurality of processors;
   dynamically controlling a processing capability of the plurality of processors to provide the determined processing requirement by selectively enabling or disabling the TCC logic of each processor, the dynamic controlling comprising:
      selectively enabling the TCC logic of a processor to reduce a processing capability of that processor; and
      selectively disabling the TCC logic of a processor to increase a processing capability of that processor;
   and
   billing a customer based on the dynamically controlled processing capability of the plurality of processors, wherein the customer is billed for an on-demand processing resource cost according to:
      on-demand processing resource cost=(a cost factor (CF))*(a number of inactive TCC logic signals)*(a time elapsed while a TCC logic signal is inactive), wherein the CF comprises: (a price of additional processors installed)+(a predetermined amount of profit generated from the additional processors)/(a time to reach a predetermined revenue).

2. The method of claim 1, wherein providing a plurality of processors further comprises:
   determining a processing requirement of a customer; and
   providing more processors than needed to satisfy the processing requirement of the customer.

3. The method of claim 1, wherein a reboot of a server system comprising the plurality of processors is not required in order to dynamically control the processing capability of the plurality of processors.

4. The method of claim 1, wherein all of the plurality of processors are enabled upon an initial system boot.

5. The method of claim 4, wherein all of the plurality of processors are enabled to operate at 1/N of a maximum execution rate at the initial system boot, wherein N is an integer greater or equal to 2.

6. The method of claim 5, wherein dynamically controlling the processing capability of the plurality of processors further comprises:
   selectively reducing or increasing a processing capability of at least one of the plurality of processors by 1/N of the maximum execution rate at a time.

7. A system for selectively allocating and deallocating processing resources, comprising:
   a server system comprising a plurality of processors, each processor having thermal control circuit (TCC) logic;
   a system for determining a processing requirement for the plurality of processors;
   a system for dynamically controlling a processing capability of the plurality of processors to provide the determined processing requirement by selectively enabling or disabling the TCC logic of each processor, the dynamic controlling comprising:
      selectively enabling the TCC logic of a processor to reduce a processing capability of that processor; and
      selectively disabling the TCC logic of a processor to increase a processing capability of that processor;
   and
   a system for billing a customer based on the dynamically controlled processing capability of the plurality of processors, wherein the customer is billed for an on-demand processing resource cost according to:
      on-demand processing resource cost=(a cost factor (CF))*(a number of inactive TCC logic signals)*(a time elapsed while a TCC logic signal is inactive), wherein the CF comprises: (a price of additional processors installed)+(a predetermined amount of profit generated from the additional processors)/(a time to reach a predetermined revenue).

8. The system of claim 7, wherein a reboot of the server system is not required in order to dynamically control the processing capability of the plurality of processors.

* * * * *